United States Patent [19]

Serafini

[11] 4,385,330
[45] May 24, 1983

[54] TAPE DRIVE METHODS AND APPARATUS WITH TAPE SLACKENING FEATURE

[75] Inventor: Joseph J. Serafini, La Verne, Calif.

[73] Assignee: Bell & Howell Company, Chicago, Ill.

[21] Appl. No.: 225,827

[22] Filed: Jan. 19, 1981

[51] Int. Cl.³ .............. G11B 15/18; G11B 15/48; G11B 15/32
[52] U.S. Cl. ................................ 360/71; 360/74.2; 242/179
[58] Field of Search .............. 360/71, 74.1, 74.2, 360/74.3, 74.5, 72.3; 242/179, 186, 189; 226/25, 42, 49

[56] References Cited

U.S. PATENT DOCUMENTS

| | | | |
|---|---|---|---|
| 3,317,679 | 5/1967 | Rank | 360/71 |
| 4,011,588 | 3/1977 | Yasuda | 360/71 |
| 4,030,131 | 6/1977 | Beiter | 360/71 |
| 4,104,685 | 8/1978 | Chang | 242/189 |
| 4,215,378 | 7/1980 | Sato | 360/74.2 |

*Primary Examiner*—Robert M. Kilgore
*Attorney, Agent, or Firm*—Benoit Law Corporation

[57] ABSTRACT

Methods and apparatus for driving a tape relative to a slant track recording scanner or other surface employ an electric motor or a capstan rotating in a first sense of rotation for an advancement of the tape. The advancing tape is tensioned into engagement with the surface. The motor is selectively decelerated to stop the tensioned tape. In practice, this could bind the tape to the particular surface, rendering subsequent tape advancement difficult. The disclosed invention thus slackens the tensioned tape from the surface by rotating the motor or the capstan in a second sense of rotation opposite to the mentioned first sense of rotation upon deceleration of the motor or capstan. The back EMF of the decelerating motor may be utilized for this purpose. The electric motor or capstan is stopped upon slackening of the tape from the surface.

26 Claims, 4 Drawing Figures

TAPE DRIVE METHODS AND APPARATUS WITH TAPE SLACKENING FEATURE

BACKGROUND OF THE INVENTION

1. Field of the Invention

The subject invention relates to tape driving methods and apparatus, to tape transports, to information recording methods and apparatus employing recording tape or tape-like recording media, and to magnetic tape recording methods and apparatus.

2. Disclosure Statement

The following disclosure statement is made pursuant to the duty of disclosure imposed by law and formulated in 37 CFR 1.56(a). No representation is hereby made that information thus disclosed in fact constitutes prior art, inasmuch as 37 CFR 1.56(a) relies on a materiality concept which depends on uncertain and inevitably subjective elements of substantial likelihood and reasonableness, and inasmuch as a growing attitude appears to require citation of material which might lead to a discovery of pertinent material though not necessarily being of itself pertinent. Also, the following comments contain conclusions and observations which have only been drawn or become apparent after conception of the subject invention or which contrast the subject invention or its merits against the background of developments subsequent in time or priority.

In magnetic tape recording, in information recording on tape-like media, and in other fields where tape is being advanced, there are many instances where the tape is driven relative to a surface and is tensioned into engagement with such surface. In such instances, the danger arises that the tensioned tape binds to the particular surface when the advancing tape is stopped. This frequently renders it difficult to restart the tape, especially if it has been stopped for a longer period of time.

By way of example, the surface in question may be the surface of a slant track recording scanner, of a recording or playback head, of a tape guide or of another object in the tape path which is engaged by the tape.

In systems which wind the tape from and onto tape reels and employ reel drive motors for this purpose, the tape may be detensioned or slackened from the particular surface by rotation of one of the reel drive motors in a reverse direction until the tape is no longer in contact with that surface. However, such technique is not feasible with tape transports that lack individual reel drive motors or that lack a servo system capable of detensioning the tape without running up an excessive tape slack.

SUMMARY OF THE INVENTION

It is a general object of this invention to overcome the disadvantages and to meet the needs expressed or implicit in the above disclosure statement or in other parts hereof.

It is a germane object of this invention to provide improved tape driving methods and apparatus.

It is a related object of this invention to provide improved tape drives.

It is also an object of this invention to provide improved information recording methods and apparatus employing recording tape or a tape-like recording medium.

It is also an object of this invention to provide improved magnetic recording tape methods and apparatus and tape transports.

Other objects of the invention will become apparent in the further course of this disclosure.

From a first aspect thereof, the subject invention resides in a method of driving a tape relative to a surface and, more specifically, resides in the improvement comprising in combination the steps of advancing the tape relative to said surface with an electric motor rotating in a first sense of rotation, tensioning the advancing tape into engagement with said surface, decelerating the motor to stop the tensioned tape in engagement with said surface, sensing the back EMF of the decelerating motor, slackening the tensioned tape from said surface by rotating the motor in a second sense of rotation opposite to the first sense of rotation in response to the sensed back EMF, and stopping the electric motor upon slackening of the tape from said surface.

From another aspect thereof, the subject invention resides in a method of driving a tape relative to a surface and, more specifically, resides in the improvement comprising in combination the steps of advancing the tape relative to said surface with an electric motor rotating in a first sense of rotation, tensioning the advancing tape into engagement with said surface, decelerating the motor to stop the tensioned tape in engagement with said surface, slackening the tensioned tape from said surface by rotating the motor in a second sense of rotation opposite to the first sense of rotation, counting revolutions of the motor rotating in the second sense of rotation, and stopping the electric motor after a predetermined number of the counted revolutions.

From another aspect thereof, the subject invention resides in a method of driving a tape relative to a surface with the aid of a tape drive capstan and, more, specifically, resides in the improvement comprising in combination the steps of advancing the tape relative to said surface with the capstan rotating in a first sense of rotation, tensioning the advancing tape into engagement with said surface, decelerating the capstan to stop the tensioned tape in engagement with said surface, slackening the tensioned tape from said surface by rotating the capstan in a second sense of rotation opposite to the first sense of rotation upon deceleration of the capstan, and stopping the capstan upon slackening of the tape from said surface.

From another aspect thereof, the subject invention resides in apparatus for driving tape relative to a surface and, more specifically, resides in the improvement comprising, in combination, means including a rotatable electric motor for advancing the tape relative to said surface, means coupled to the tape for tensioning the advancing tape into engagement with said surface, means connected to the motor for selectively decelerating the motor to stop the tensioned tape in engagement with said surface, means connected to the motor for sensing the back EMF of the decelerating motor, and means connected to the motor for slackening the tensioned tape from said surface by reversing the motor as to a direction of rotation in response to the sensed back EMF, and for stopping the motor upon slackening of the tape from said surface.

From another aspect thereof, the subject invention resides in apparatus for driving tape relative to a surface and, more specifically, in the improvement comprising, in combination, means including a rotatable electric motor for advancing the tape relative to said surface, means coupled to the tape for tensioning the advancing tape into engagement with said surface, means connected to the motor for selectively decelerating the motor to stop the tensioned tape in engagement with said surface, means connected to the motor for slackening the tensioned tape from said surface by rotating the motor in a second sense of rotation opposite to the first sense of rotation, means coupled to the motor for counting revolutions of the motor rotating in the second sense of rotation and for stopping the motor after a predetermined number of the revolutions.

From another aspect thereof, the subject invention resides in apparatus for driving tape relative to a surface, the improvement comprising, in combination, means including a rotatable tape drive capstan for advancing the tape relative to said surface, means coupled to the tape for tensioning the advancing tape into engagement with said surface, means for selectively decelerating the capstan to stop the tensioned tape in engagement with said surface, and means for slackening the tensioned tape from said surface by reversing the capstan as to a direction of rotation upon operation of the decelerating means, and for stopping the capstan upon slackening of the tape from said surface.

BRIEF DESCRIPTION OF THE DRAWINGS

The subject invention and its various objects and aspects will become more readily apparent from the following detailed description of preferred embodiments thereof, illustrated by way of example in the accompanying drawings, in which like reference numerals designate like or functionally equivalent parts, and in which.

DESCRIPTION OF PREFERRED EMBODIMENTS

Figure 1:
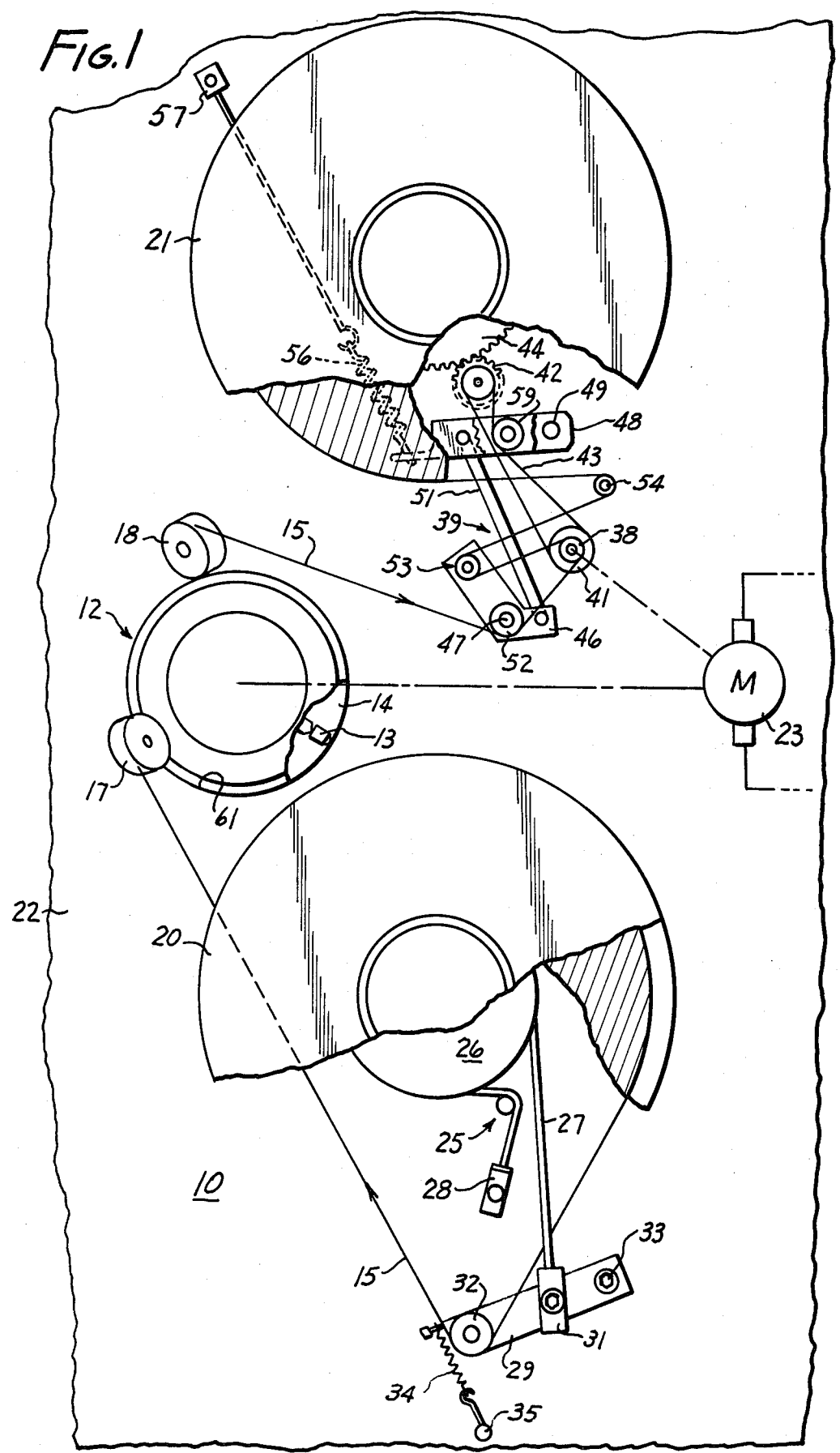
FIG. 1 is a plan view of a tape transport employing the subject invention according to a preferred embodiment thereof.

The tape transport 10 shown by way of example in FIG. 1 is of a magnetic slant track recording type, employing a half-wrap omega scanner 12 which may be of a conventional type, typically employing two or more rotating magnetic recording and/or playback heads, one of which is visible at 13. These heads, typically attached to a rotating head disk 14, take turns in recording information in, or reproducing information from, slanted tracks extending obliquely across a magnetic recording tape 15.

Of course, the invention is also applicable to optical or other non-magnetic recording systems in which a tape or tape/like medium is advanced relative to a surface on which it may bind in a stationary condition. Also, a known alpha wrap scanner may be employed at 12, in which case it would be possible to record or reproduce information from the tape 15 fairly continuously with a single head 13. In either case, slanted rollers 17 and 18 are employed to apply the tape 15 to the scanner 12 in the requisite helical wrap.

In addition to the rotating head or heads, stationary recording and reproducing heads (not shown) may be employed for such purposes as transferring control and pilot signals and audio information relative to the tape 15 and monitoring the information recording process.

In practice, the invention is applicable to bidirectional tape drives. However, by way of example, FIG. 1 shows two tape reels as a tape supply reel 20 and a take-up reel 21, respectively.

The reels 20 and 21 are mounted for rotation relative to a baseplate 22, but do not have individual reel drive motors. Rather, the illustrated tape transport uses only one motor 23 for operating the entire mechanism. In practice, more than one motor may, however, be employed, such as an extra motor (not shown) for rotating the head disk 14.

A mechanical tape supply tension servo system 25 is associated with the tape supply reel 20. This tape tension servo system 25 has a brake drum 26 frictionally engaged by a brake cord 27 which is looped about the brake drum 26. One end of the brake cord is anchored to the baseplate 22 at 28, and the other end of this brake cord is connected to a tension lever 29 at 31.

The tension lever 29 has a free end equipped with a roller 32 which is engaged by a loop of the tape 15. As this tape loop increases and decreases, the lever 29 swings about a pivot point 33. The lever 29 is biased at its free end by a tension spring 34 which is anchored to the baseplate 10 at 35.

Tape tension may be changed by adjusting the tension of the spring 34. In the operation of the tape transport 10, the servo mechanism 25 acts as a drag brake maintaining constant tape tension. If the tape loop around the roller 32 decreases in size relative to a desired value, the pivoting lever 29 relaxes the brake cord 27 on the drum 26, thereby permitting the supply reel 20 to turn faster and restore the desired tape tension. Conversely, if the tape loop around the roller 32 increases beyond a desired value, the pivoting lever 29 tightens the brake cord 27 around the drum 26, thereby increasing the tape tension to the desired value.

The tape 15 advances from the tape tension servo mechanism via roller 17 to the slant track scanner 12 for a recording or reproduction of information relative to the helically guided tape. A tape drive capstan 38 advances the tape 15 from the tape supply reel 20 relative to the scanner 12 through the take-up reel servo mechanism 39 to the take-up reel 21. To this end, the capstan 38 is coupled to and driven by the motor 23.

The take-up reel servo mechanism 39 operates according to a slipping reel drive belt principle. In particular, the motor 23 drives a capstan pulley 41 when rotating the capstan 38. The rotating capstan pulley 41, in turn, drives a pinion 42 via a drive belt 43. The driven pinion 42 rotates the take-up reel 21 via a gear wheel 44. The transmission ratio of the pulley 41, belt 43, pinion 42 and gear wheel 44 is such that the take-up reel 21 is overdriven by the motor 23 relative to the capstan 38. In other words, the take-up reel 21 would turn too fast in the long run, if there were no controlled slip between the drive belt 43 and the pulleys at 41 and 42. The more the belt 43 slips, the less drive torque is delivered to the take-up reel 21 and, hence, the smaller is the tape tension.

To this end, the servo mechanism 39 has a tape tension sensing arm 46 pivoted relative to the baseplate 22 at 47, and a tension idler arm 48 pivoted relative to the baseplate at 49. The pivoted arms 46 and 48 are interconnected by a linking rod 51.

The tape 15 advances from the scanner 12 via scanner exit roller 18 and an idler roller 52 at the pivot 47 to the capstan 38 and thence via a tape tension sensing roller 53 and an idler roller 54 to the take-up reel 21. The sensing roller 53 is rotatably mounted at a free end of the servo arm 46. The idler roller 54 is rotatably mounted on the baseplate 22.

If the overdriven take-up reel 21 is driven too fast and the tape tension tends to become excessive, the diminishing tape loop at 53 rocks the servo arm 46 clockwise, as seen in FIG. 1. The link 51 translates such angular movement of the servo arm 46 in a counter-clockwise movement of the idler arm 48 about the pivot 49, against the bias of a tension spring 56 which is anchored to the baseplate 22 at 57.

A pulley 59 is rotatably mounted on a midportion of the idler arm 48 between the spring-biased free end thereof and the pivot point 49. If the idler arm 48 is moved counter-clockwise as seen in FIG. 1, then the pulley 59 will permit the drive belt 43 to slacken and slip on the pulley at 42. This, in turn, reduces the drive torque transmitted to the take-up reel 21, whereby the take-up reel rotates slower and the tape tension decreases.

If such tape tension decrease becomes excessive, the widening tape loop at 53 permits the servo arm 46 to rock counter-clockwise whereby the idler arm 48 is rocked clockwise about the pivot point 49 under the bias of the tension spring 56. In consequence, the pulley 59 tightens the drive belt 43 about the pulley at the pinion 42, whereby increasing torque is supplied by to the take-up reel 21 from the motor 23.

As a result, the take-up reel 21 turns faster, restoring the tape loop at 53 and thus tape tension to their desired values.

Accordingly, the mechanical servo systems 25 and 39 maintain a fairly constant tape tension during the operation of the tape transport 10. However, unlike electrically servoed systems with individual reel drive motors, mechanical servo systems of the type shown in FIG. 1 will simply coast to a stop while maintaining tape tension when the motor 23 is turned off. In consequence, the tape 15 is tightly held in contact with the outer surface 61 of the scanner 12 when the tape transport is at rest. In practice, this causes the tape 15 to bind or adhere to the scanner 12, rendering restarting of the tape transport difficult, especially after prolonged rest periods. Unlike electrically servoed systems, mechanically servoed systems of the type shown in FIG. 1 are not amenable to the conventional tape slackening servoing techniques.

In order to remedy this drawback, the illustrated preferred embodiment of the subject invention effects a desired slackening of the tape from the scanner surface 61 via the drive motor 23. This will now be explained with the aid of examples shown in the remainder of the drawings, starting with FIG. 2. In this respect, it should be understood that the principles of the invention shown in FIG. 2 et seq. are also applicable to other tape drive and transport systems, including, for example, systems in which the tape is also driven by a capstan between the scanner 12 and the reel 20, and systems in which the surface from which the tensioned tape is to be slackened is the surface of a stationary recording device, of a guide or of another component of the tape transport in the tape path.

Figure 2:
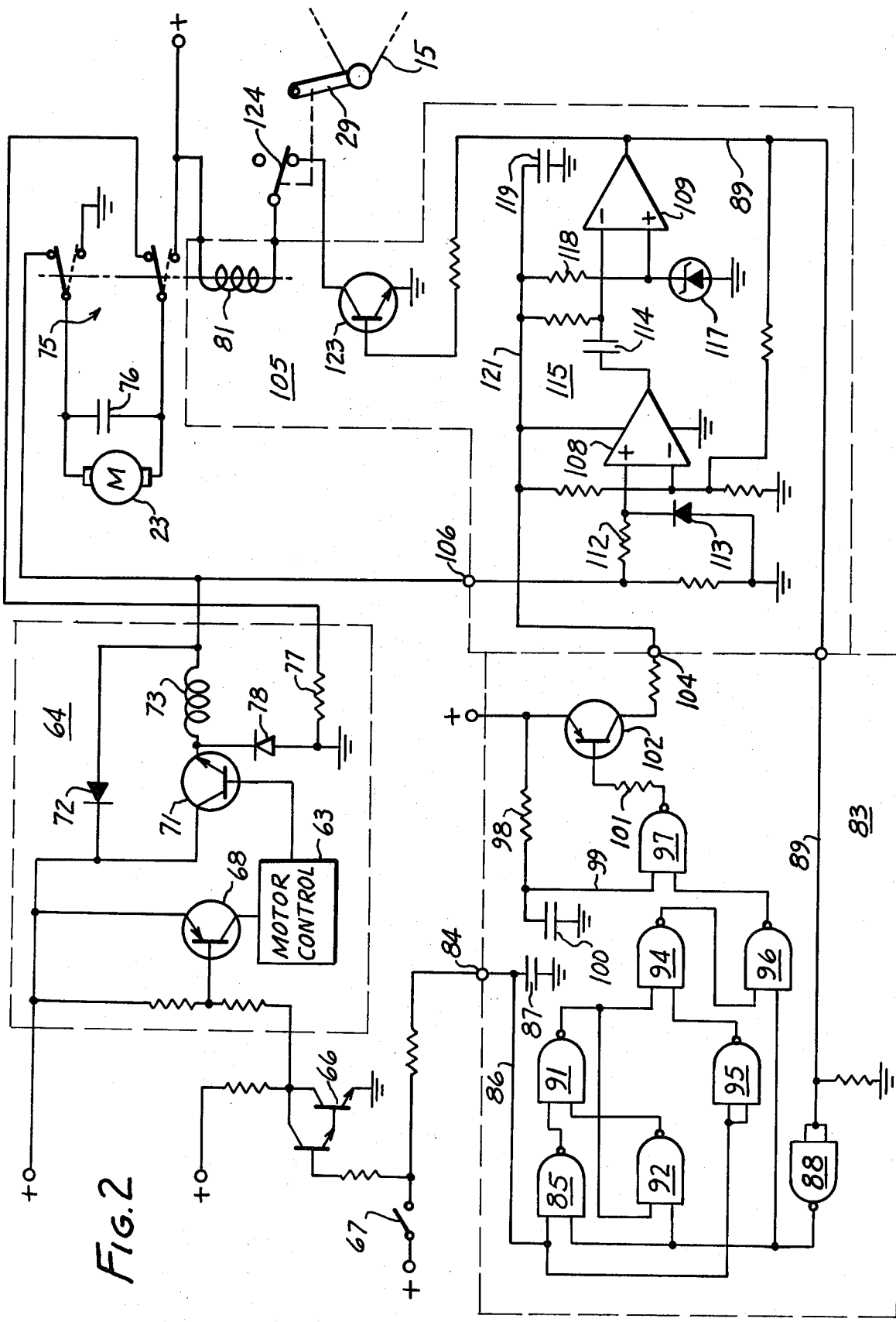
FIG. 2 is a circuit diagram of an electric motor energization system employing the subject invention in a preferred embodiment thereof, and being, for instance, usable with the tape transport of FIG. 1.

In FIG. 2, the motor 23 of the tape transport 10 shown in FIG. 1 is controlled by a motor control 63 which may be of a conventional type. By way of example, the motor control 63 may be of the integrated circuit type SG1524 described as regulating pulse width modulator in the Silicon General Linear Integrated Circuits Product Catalog 1979, pp. 23 et seq. In practice, the component 63 may include a conventional servo control which assures proper rotation of the motor 13, such as by means of a tachometer (not shown) coupled to the motor 23 or to the rotating head disk 14, as customary with rotating head scanners.

The motor control 63 is part of a motor energization circuit 64 which is turned on via a darlington 66 upon closure of a main on-off switch 67. The motor control 63 is energized via a transistor 68 upon closure of the darlington 66.

The motor control 63, in turn, controls, a power transistor 71 which is protected by a spike surpressor 72 and is in series with a filter inductor 73 for reduction of the square waves supplied by the output of the motor control 63 to a varying direct-current voltage for energization of the motor 23 via a double-pole, double-throw switch 75. A capaacitor 76 in parallel to the motor 23 cooperates with the inductor 73 to this effect, and can discharge itself through a resistor 77 and catch diode 78.

In the solidly illustrated position of the switch 75, the motor 23 may thus be energized and controlled in a conventional manner. According to a preferred embodiment of the subject invention, the switch 75 is actuated to an alternative position, shown in FIG. 2 by dotted lines, in order to cause the motor 23 to slacken or de-tension the tape 15 from the scanner surface 61 at the end of a recording, playback or other tape run cycle. In FIG. 2, a relay 81 has been shown for this purpose, but it should be understood that such relay, as well as the switch 75, may in practice be replaced by electronic equivalents, if desired.

When the main switch 67 is closed for an energization of the motor control circuitry 64, latch circuitry 83 is energized at the same time via an input 84. A NAND element 85 in the latch circuitry 83 thus receives a high input via a line 86 which has a filter capacitor 87 connected thereto. The other input of the NAND element 85 at that time receives a high output level from an inverter 88 which is receiving a low input signal via a re-latch line 89.

The resulting low output of the NAND element 85 is applied to a first input of a further NAND element 91 which has a second input connected to the output of a NAND element 92. The output of the NAND element 92 is also low at that time, since in that case the output of the NAND element 91 connected to a first input of the NAND element 92 is high, while the output of the inverter 88 connected to a second input of the NAND element 92 is also high.

The resulting high output of the NAND element 91 is applied to a first input of a further NAND element 94, the second input of which is then receiving a low output level from an inverter 95 which is then receiving the high input signal provided by closure of the switch 67.

The resulting high output level of the NAND element 94 is applied to a first input of a NAND element 96, the second input of which also receives a high output level from the inverter 88. A low output signal is thus applied by the NAND element 96 to a NAND element 97, the other input of which receives the high power supply level via a resistor 98 and line 99, having a filter capacitor 100 connected thereto.

The resulting high output signal of the NAND element 97 is applied via a resistor 101 to the base of a PNP transistor 102 which is thus kept in an "off" condition in response to closure of the main switch 67 and energization of the motor control circuitry 64 and drive motor 23.

The output of the transistor 102 is connected via a terminal 104 to a back EMF sensing and timing circuit 105. Another input 106 of the circuit 105 is connected to one of the contacts of the switch 75, in order to sense the back EMF of the motor 23 in the solidly illustrated position of the switch 75.

The circuitry 105 includes two integrated circuits 108 and 109 which, by way of example, may be of the type LM158 described as operational amplifier in the National Semiconductor Linear Databook, pp. 3–148 et seq.

The component 108 operates as a voltage comparator, having an inverting input connected via a voltage divider to the output 104 of the latch circuitry 83, and having a non-inverting input connected via a resistor 112 to the back EMF sensing terminal 106. The voltage comparator 108 is protected by a spike suppressor 113. The voltage comparator 108 has an output connected to a capacitor 114 of a RC time constant network 115. The other side of the RC network 115 is connected to the inverting input of the component 109 which acts as a one-shot multivibrator. A series-connected zener diode 117 and resistor 118 apply a voltage standard to the non-inverting input of the multivibrator component 109. The circuit also includes a filter capacitor 119.

The component 109 has a low output when its inverting input is high. The motor control switch 75 then remains in its solidly illustrated position, with the tape drive motor 23 being energized from the motor control circuitry 64 for an advancement of the tape and normal operation of the scanner 12 and recording or playback function. Termination of this operation and stoppage of the tape 15 may be initiated by opening the main switch 67 or by effecting a similar deenergizing function.

This will remove the above mentioned high level from the input 84 of the latch circuit 83 and thus from the input of the NAND element which is connected to the lead 86. The outputs of the NAND element 85 and 92 will thus go high while the output of the NAND element 94 goes low. Simultaneously, the output of the inverter 95 goes high, whereby the output of the NAND element 94 goes low.

This, in turn, causes the output of the NAND element 96 to go high, whereby the output of the NAND element 97 goes low. As a result, the transistor 102 is turned "on", supplying power to the sensing and timing circuitry 105 via terminal 104 and a supply lead 121. The sensing and timing circuitry 105 is thus enabled to operate by the latch 83.

During energization of the motor 23 by the motor control circuitry 64, the voltage applied to the circuit 105 via terminal 106 is too high as to initiate a timing function by the RC circuit 115. However, as the motor 23 upon deenergization by the control circuitry 64 is coasting to a stop, its back EMF being sensed by the circuitry 104 will reach a sufficiently low level as to enable the voltage comparator 108 to initiate a timing function with the RC circuit 115. This, in turn, causes the one-shot multivibrator to apply a high level pulse to the base of a transistor 123, thereby causing that transistor to energize the relay 81 via a normally closed switch 124.

The energized relay 81 actuates the switch 75 to its alternative position, indicated by dotted line in FIG. 2. This reverses the polarity with which the motor 23 is energized. The motor 23 is of a kind, such as a permanent magnet field type, that will reverse its sense or direction of rotation in response to a reversal of polarity of its energizing current.

A reversal of the direction of rotation of the motor 23 causes the tensioned tape 15 to become de-tensioned, and to slacken from the scanner surface 61.

In this respect, as the direction of rotation of the motor 23 reverses, the tape supply reel 20 remains stationary, since it is not driven by the motor 23, while the capstan 38 and take-up reel 21 are driven in a reverse direction. Since the take-up reel 21 is overdriven at a speed higher than the capstan speed, a tape loop is developed and the tape will become slack.

The time for which the motor 23 is driven in reverse is determined by the one-shot time delay provided by the components 109 and 115. As a safety feature, the switch 124 is coupled to a tape tension sensing lever, such as the lever 29 shown in FIG. 2, in order to break the energization of the relay 81 when the tape 18 has attained a predetermined slackness. Excessive slackening of the tape 15 may thus be avoided. In particular, deenergization of the relay 81 returns the switch 75 to its solidly illustrated position. No energization of the motor 23 will, however, take place at that time, as long as the main switch 67 is open.

Upon reenergization of the motor control circuitry 64 and motor 23 through closure of the main switch 67, the latch circuit 83 will again prevent initially an energization of the supply lead 121 of the sensing and timing circuitry 105. The motor 23 is thus again energized from the motor control circuitry 64 for normal tape advance and recording or playback operation. Upon reopening of the main switch 67 or similar deenergization function, the above mentioned tape stopping and reversal function will repeat itself under the control of the sensing and timing circuit 105. Each time, the latching circuit 83 is re-latched via line 89 causing suspension of the supply of power via lead 121.

According to a further embodiment of the subject invention, the timing function of the RC component 115 may be replaced by a counting function. For instance, a modified sensing circuit 105 may actually count the number of revolutions by which the motor 23 is turning in its reverse direction for the desired slackening of the tape 15 from the scanner surface 61 or from another given surface in its path.

Figure 3:
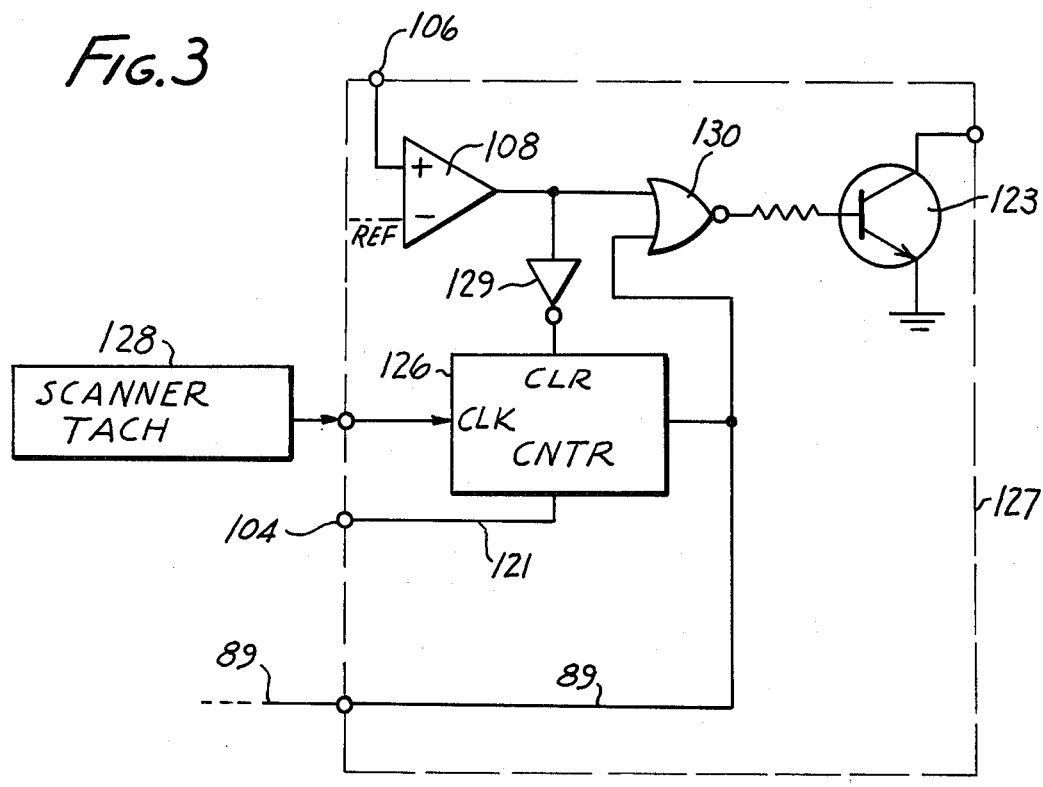
FIG. 3 is a circuit diagram of a counter circuit which may be employed in the circuitry of FIG. 2 according to a further embodiment of the subject invention.

As diagrammatically illustrated in FIG. 3, a counter 126 may be employed for this purpose. The counter 126 may be energized from the latch 83 shown in FIG. 2 via terminal 104 and line 121. The counter 126 may be enabled by the low back EMF signal derived via terminal 106 shown in FIGS. 2 and 3. The counter 126 may then count a number of pulses indicative of revolutions of the motor 23. A good source of such pulses is the scanner revolution tachometer 128 of the type customarily present in slant track recording apparatus in order to provide positional information about the rotating head disk 14. Such approach generally works, when the scanner 12 is also driven by the motor 23, as indicated in FIG. 1. A tachometer of the motor 23 may alternatively be employed, especially if the scanner 12 has its own separate drive motor, as in some slant track scanning apparatus.

In the embodiment shown in FIG. 3, the voltage comparator 108 of the type shown in FIG. 2 inhibits the counter 126 via an inverter 129 connected to its clear input CLR, and inhibits the transistor 123 from energizing the relay 81, as long as the motor 23 is running. As the motor 23 stops, the voltage comparator 108 enables the transistor 123 via a NOR element 130 to energize the polarity reversal relay 81, whereby the sense of rotation of the motor 23 is reversed as mentioned above, causing the tensioned tape 15 to slacken. Simultaneously, the comparator 108 also enables the counter 126 via inverter 129 and clear input CLR. Accordingly, as the tape 15 is slackening, the counter 126 counts the pulses of the tachometer 128. At the end of a counting cycle, the counter 126 deenergizes relay 81 via NOR element 130 and transistor 123 and re-latches the latch 83 via line 89. The number of pulses counted during a counting cycle indicate a sufficient number of reverse revolutions of the motor 23 for effectuation of the desired slackening of the tape 15 from the surface 61.

The counter 126 enables a precise amount of tape to be relaxed during tape de-tensioning or slackening. By way of example, the counter 126 comprises a counter chain and provides at its output a pulse determining the desired length of the reverse energization of the motor 23. The circuit 127 shown in FIG. 3 may be substituted for the circuit 105 in the circuitry of FIG. 2.

Figure 4:
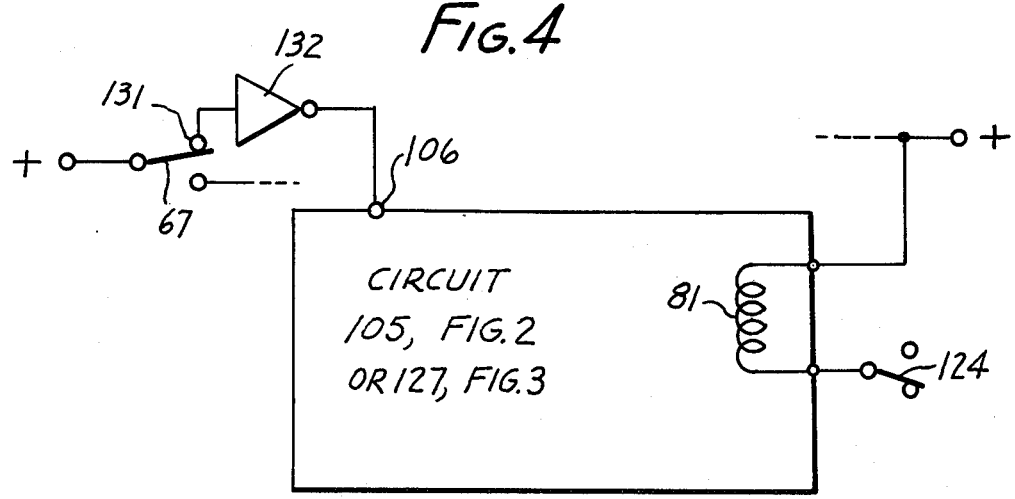
FIG. 4 is a block diagram of a circuit modification usable in connection with the circuitry of FIG. 2 or 3 according to an embodiment of the invention.

According to a further embodiment of the subject invention, the polarity of energization of the motor 23 is reversed in response to a stop command. To this end, the switch 67 shown in FIG. 2 may be provided with an additional contact 131, to which a potential is applied from the power supply when the main energization switch 67 is turned off. In that case, an inverter 132 will apply the requisite low potential to the sensing input 106 of the timing circuit 105 shown in FIG. 2 or the counter circuit 127 shown in FIG. 3. The remainder of the circuitry shown in FIG. 2 may be the same in the embodiment indicated in FIG. 4, with the stop command provided via inverter 132 taking the place of the sensed back EMF of the motor 23 previously provided via switch 75.

The embodiment shown in FIGS. 1 to 4 provides methods and apparatus of driving a tape 15 relative to a surface, such as the scanner surface 51, with the aid of the capstan 38.

Such methods and apparatus according to an aspect of the subject invention advance the tape 15 relative to the surface 61 with the capstan 38 rotating in a first sense of rotation. The mechanical servo systems 25 and 39 thereby tension the advancing tape into engagement with the surface 61.

At the end of a tape advancing or information transfer cycle, the capstan 38 may be decelerated to stop the tensioned tape 15 in engagement with the surface 61. The main switch 67 may be opened for that purpose. The tensioned tape is then slackened from the surface 61 by rotating the capstan 38 in a second sense of rotation opposite to the mentioned first sense upon deceleration of the capstan 38. The back EMF sensing circuits 105 or 129 of FIGS. 2 and 3 or the stop command sensing circuit of FIG. 4 may be employed for this purpose in conjunction with the relay 81 and polarity reversal switch 75. The illustrated methods and apparatus stop the capstan 38 upon slackening of the tape 15 from the surface 61. To this end, the timing circuit 109 and 115 of FIG. 2, or the counter circuit 126 of FIG. 3 may be employed, if desired, in conjunction with the limit switch 124, in order to prevent excessive unraveling of the tape.

From another aspect of the invention, also illustrated in the drawings, the tape 15 is advanced relative to the surface 61 with an electric motor 23 rotating in a first sense of rotation. The advancing tape 15 is agin tensioned into engagement with the surface 61. The motor 23 is decelerated to stop the tensioned tape again in engagement with the surface 61. The back EMF of the decelerating motor 23 is then sensed, and the tensioned tape is slackened from the surface 61 by rotating the motor 23 in a second sense of rotation opposite to the mentioned first sense in response to the sensed back EMF.

Again, the electric motor 23 is stopped upon slackening of the tape 15 from the surface 61.

In terms of equipment, motor control circuitry 64 equipped with a switch 67 is connected to the motor 23 for selectively decelerating such motor to stop the tensioned tape 15 in engagement with the surface 61. The circuit 105 is connected to the motor 23 via switch 75 for sensing the back EMF of the decelerating motor. The electrically actuated polarity reversal switch 75 with energizing supply leads is also connected to the motor 23 for slackening the tensioned tape from the surface 61 by reversing the motor 23 as to a direction of rotation in response to the sensed back EMF. The timing circuits 109 and 115 or the counter-circuit 126, supplemented by a limit switch 124, if desired, also stop the motor 23 upon slackening of the tape form the surface 61.

As mentioned above, the circuitry 105, including a timing circuit 109 and 115, times the slackening of the tensioned tape 15 as to duration, and affects the stopping of the electric motor or capstan in response to such timing, so as to avoid an excessive slack in the tape.

On the other hand, the embodiment shown in FIG. 3, including a counter 126, counts revolutions of the motor or capstan rotating in the mentioned second or reverse sense of rotation, and stops the electric motor or capstan after a predetermined number of such counted revolutions, so as to avoid also an excessive slack in the tape.

In practice, the counting of the motor or capstan revolutions may proceed directly, such as by means of a revolution tachometer connected to the motor or capstan, or indirectly, such as by a scanner revolution tachometer, as indicated above.

The subject invention meets all of its above mentioned objectives. In practice, the subject invention has been capable of assisting the development of high-recision video information and instrumentation recorders characterized by extremely low size, weight and power requirements coupled with a wide bandwidth. For instance, the recorder shown in FIG. 1 has been built for a recording bandwidth of 8 MHz at an equipment weight of only 14 lbs and the power requirements of only 15 Watts. Despite such low power input, the particular recorder, for a given tape load, had a recording time which was better than four times higher than the recording time of comparable recorders, in terms of bandwidth and overall volume occupied by the recorder apparatus.

At power supply inputs which are some five to ten times lower than the power requirements of comparable tape recorders, it is particularly important that the equipment reliably restart after any pause in tape advance. In this respect, the subject invention, with its tape slackening feature, renders a real contribution to the development of various tape recorders and similar equipment in which mechanical servoing is employed for maintaining proper tape tension, in preference to the use of bulkier, heavier and more costly electronic tape tension servo systems which employ individual reel drive motors that can be appropriately controlled for achieving a desired tape slackening effect.

Some aspects of the invention, such as a reversal of the direction of capstan rotation, a counting of reverse capstan or drive motor revolutions, and a timing of such reverse rotation, may also be employed in combination with electronic tape tension servo systems.

Moreover, the subject extensive disclosure renders apparent and suggests to those skilled in the art various modifications and variations within the spirit and scope of the subject invention.

I claim:

1. In a method of driving a tape relative to a surface, the improvement comprising in combination the steps of:
   advancing the tape relative to said surface with an electric motor rotating in a first sense of rotation;
   tensioning said advancing tape into engagement with said surface;
   decelerating said motor to stop said tensioned tape in engagement with said surface;
   sensing the back EMF of said decelerating motor;
   slackening said tensioned tape from said surface by rotating said motor in a second sense of rotation opposite to said first sense of rotation in response to said sensed back EMF; and
   stopping said electric motor upon slackening of the tape from said surface.

2. A method as claimed in claim 1, including:
   timing said slackening of the tensioned tape as to duration; and
   effecting said stopping of the electric motor in response to said timing.

3. In a method of driving a tape relative to a surface, the improvement comprising in combination the steps of:
   advancing the tape relative to said surface with an electric motor rotating in a first sense of rotation;
   tensioning said advancing tape into engagement with said surface;
   decelerating said motor to stop said tensioned tape in engagement with said surface;
   slackening said tensioned tape from said surface by rotating said motor in a second sense of rotation opposite to said first sense of rotation;
   counting revolutions of said motor rotating in said second sense of rotation; and
   stopping said electric motor after a predetermined number of said counted revolutions.

4. A method as claimed in claim 1, 2 or 3, including the steps of:
   rotating said motor in said second sense of rotation by reversing a polarity of energization of said motor.

5. A method as claimed in claim 1, 2 or 3, including the steps of:
   driving with said motor a capstan for advancing said tape and a take-up reel for winding said tape; and
   mechanically servoing said take-up reel in response to tape tension.

6. A method as claimed in claim 5, including the steps of:
   unwinding said advancing tape from a supply reel; and
   mechanically servoing said supply reel in response to tape tension.

7. A method as claimed in claim 5, including the step of:
   overdriving said take-up reel relative to said capstan.

8. In a method of driving a tape relative to a surface with the aid of a tape drive capstan, the improvement comprising in combination the steps of:
   advancing the tape relative to said surface with said capstan rotating in a first sense of rotation;
   tensioning said advancing tape into engagement with said surface;
   decelerating said capstan to stop said tensioned tape in engagement with said surface;
   slackening said tensioned tape from said surface by rotating said capstan in a second sense of rotation opposite to said first sense of rotation upon deceleration of said capstan; and
   stopping said capstan upon slackening of the tape from said surface.

9. A method as claimed in claim 8, including the steps of:
   timing said slackening of the tensioned tape as to duration; and
   effecting said stopping of said capstan in response to said timing.

10. A method as claimed in claim 8, including the steps of:
    counting revolutions of said capstan rotating in said second sense of rotation; and
    effecting said stopping of the capstan after a predetermined number of said counted revolutions.

11. A method as claimed in claim 8, 9 or 10, including the steps of:
    rotating jointly with said capstan a take-up reel for winding said tape; and
    mechanically servoing said take-up reel in response to tape tension.

12. A method as claimed in claim 11, including the steps of:
    unwinding said advancing tape from a supply reel; and
    mechanically servoing said supply reel in response to tape tension.

13. A method as claimed in claim 11, including the steps of:
    overdriving said take-up reel relative to said capstan.

14. In apparatus for driving tape relative to a surface, the improvement comprising in combination:
    means including a rotatable electric motor for advancing said tape relative to said surface;
    means coupled to said tape for tensioning said advancing tape into engagement with said surface;
    means connected to said motor for selectively decelerating said motor to stop said tensioned tape in engagement with said surface;
    means connected to said motor for sensing the back EMF of said decelerating motor; and
    means connected to said motor for slackening said tensioned tape from said surface by reversing said motor as to a direction of rotation in response to said sensed back EMF, and for stopping said motor upon slackening of the tape from said surface.

15. Apparatus as claimed in claim 14, wherein:
    said slackening means include means for timing said slackening of the tape as to duration, and for stopping said motor in response to said timing.

16. In apparatus for driving tape relative to a surface, the improvement comprising in combination:
   means including a rotatable electric motor for advancing said tape relative to said surface;
   means coupled to said tape for tensioning said advancing tape into engagement with said surface;
   means connected to said motor for selectively decelerating said motor to stop said tensioned tape in engagement with said surface;
   means connected to said motor for slackening said tensioned tape from said surface by rotating said motor in a second sense of rotation opposite to said first sense of rotation;
   means coupled to said motor for counting revolutions of said motor rotating in said second sense of rotation and for stopping said motor after a predetermined number of said revolutions.

17. Apparatus as claimed in claim 14, 15 or 16, wherein:
   said slackening means include means for rotating said motor in said second sense of rotation by reversing a polarity of energization of said motor.

18. Apparatus as claimed in claim 14, 15 or 16, including:
   a capstan coupled to said motor for advancing said tape;
   a take-up reel coupled to said motor for winding said tape; and
   mechanical tape tension servo means coupled to said take-up reel.

19. Apparatus as claimed in claim 18, including:
   a supply reel for said tape; and
   mechanical tape tension servo means coupled to said supply reel.

20. Apparatus as claimed in claim 18, including:
   means coupled to said take-up reel for overdriving said take-up reel relative to said capstan.

21. In apparatus for driving tape relative to a surface, the improvement comprising in combination:
   means including a rotatable tape drive capstan for advancing said tape relative to said surface;
   means coupled to said tape for tensioning said advancing tape into engagement with said surface;
   means for selectively decelerating said capstan to stop said tensioned tape in engagement with said surface; and
   means for slackening said tensioned tape from said surface by reversing said capstan as to a direction of rotation upon operation of said decelerating means, and for stopping said capstan upon slackening of the tape from said surface.

22. Apparatus as claimed in claim 21, wherein:
   said slackening means include means for timing said slackening of the tape as to duration, and for stopping said capstan in response to said timing.

23. Apparatus as claimed in claim 21, wherein:
   said slackening means include means for counting revolutions of said capstan in said second sense of rotation, and for stopping said capstan after a predetermined number of said counted revolutions.

24. Apparatus as claimed in claim 21, 22 or 23, including:
   a take-up reel for winding said tape;
   means coupled to said take-up reel for winding said tape; and
   mechanical tape tension servo means coupled to said take-up reel.

25. Apparatus as claimed in claim 24, including:
   a supply reel for said tape; and
   mechanical tape tension servo means coupled to said supply reel.

26. Apparatus as claimed in claim 24, including:
   means coupled to said take-up reel for overdriving said take-up reel relative to said tape.

* * * * *